(12) United States Patent
Mahalingam

(10) Patent No.: US 8,660,528 B2
(45) Date of Patent: Feb. 25, 2014

(54) ADAPTIVE COVERAGE AREA BY BEACON BREATHING

(75) Inventor: Nagi Mahalingam, San Diego, CA (US)

(73) Assignee: Radisys Corporation, Hillsboro, OR (US)

( * ) Notice: Subject to any disclaimer, the term of this patent is extended or adjusted under 35 U.S.C. 154(b) by 0 days.

(21) Appl. No.: 13/461,607

(22) Filed: May 1, 2012

(65) Prior Publication Data

US 2013/0295879 A1    Nov. 7, 2013

(51) Int. Cl.
    *H04M 1/66*    (2006.01)
(52) U.S. Cl.
    USPC ............................................. 455/410

(58) Field of Classification Search
    USPC ............. 455/411, 438, 445, 561, 436, 435.1, 455/424, 437, 410, 456.1; 370/328, 338
    See application file for complete search history.

(56) References Cited

U.S. PATENT DOCUMENTS

| | | | |
|---|---|---|---|
| 2010/0279686 A1* | 11/2010 | Tokgoz et al. | 455/435.1 |
| 2010/0290389 A1* | 11/2010 | Hou et al. | 370/328 |
| 2012/0309394 A1* | 12/2012 | Radulescu et al. | 455/436 |

* cited by examiner

*Primary Examiner* — Kiet Doan

(57) ABSTRACT

The embodiments disclosed herein relate to a system and method for redirecting unauthorized user equipment (UE) from a femto base station (BS) to a macro network. The system checks whether the UE is authorized or not by comparing the identifier of the UE with a list of authorized UE that are stored in the memory of the femto BS. If the UE is found to be unauthorized, the UE is redirected to the macro network.

8 Claims, 6 Drawing Sheets

ADAPTIVE COVERAGE AREA BY BEACON BREATHING

TECHNICAL FIELD

The embodiments herein relate to femto cell based networks and, more particularly, to managing user equipments (UEs) in a femto cell based network.

BACKGROUND

Femto cells or femto cell access points (FAP) are small cellular base stations designed for extending coverage of wireless communication networks. Each femto cell provides services to users registered to that particular FAP. FAPs use broadband connectivity in order to connect to the operator network.

All base stations, including FAPs, broadcast certain basic information such as location area code (LAC) in the form of system information blocks, which is used by user equipment (UE) to identify and access the base station.

A UE tries to perform cell reselection by evaluating serving cell and neighbor cell measurements and by reading the system information blocks broadcasted by serving cell and neighbor cell. Within the context of a femto radio access network (RAN), during the cell reselection process, the UE may encounter a "closed access" neighbor cell in which it is prohibited to access. A UE that is older than 3gPP ($3^{rd}$ generation partnership project) release 8 or a UE that is not closed subscriber group (CSG) capable would not be femto aware and hence would not be aware that the UE is unauthorized to use the closed access neighbor cell. When the FAP receives a connection request from an unknown UE, the FAP attempts to identify the UE. If the UE is unauthorized, the FAP sends a non-access stratum (NAS) rejection message indicating that the UE is not allowed in the location area and hence unauthorized to access that FAP. The FAP checks whether the UE is authorized or not by comparing the UE's identity to a list of UE identities pre-configured in the FAP at the time of provisioning.

There are undesired consequences for the UE when a NAS reject is enforced with cause "location area not allowed." When an LAC is barred, the UE considers that cell is forbidden until a time at which the UE is power cycled or the universal subscriber identity module (USIM) is reinserted. If an LAC is forbidden, any cell broadcasting that particular LAC is considered forbidden for service for the UE.

The undesired effects can be mitigated if the FAP chooses not to reject the UE with a NAS message with cause "location area not allowed." If the FAP chooses not to reject the UE harshly, i.e., a NAS message with cause "location area not allowed," the UE returns to the FAP whenever a cell reselection procedure at the UE identifies the FAP as the stronger network. Frequent attempts to access the FAP drains the UE's standby time power quicker and hence creates another undesirable effect.

To counter these adverse effects, existing techniques used in deployed networks include rejecting the unauthorized UEs harshly with a NAS reject with cause "location area not allowed" but at the same time limiting the possibility of such harsh rejects to a minimum. An existing method combats this problem by implementing a "beacon" along with the FAP. A beacon is a "partial" cellular site in that it puts out its own primary scrambling code (PSC), primary common pilot channel (PCPICH), primary common control physical channel (PCCPCH), secondary common control physical channel (SCCPCH), and broadcast channel (BCH). A typical deployment case is that the FAP's serving channel (the channel that serves various UE) is deployed on a dedicated frequency, thus making the femto radio access network (RAN) an inter-frequency deployment with respect to the macro network.

However, the beacon channel, co-located with the FAP's service channel, is deployed on the same frequency as the macro network. That is, the beacon is an intra-frequency neighbor to the macro network. The macro network in its system information only broadcasts (indicates) existence of beacon channels and not the FAP's service channel. Since the FAP's service channel is not broadcast on the macro network, the UE that are camped on the macro network do not measure the inter-frequency neighbor and hence avoid the drastic reduction in standby time associated with measurements of inter-frequency neighbors.

During the measurement and cell reselection procedures, the UE that are camped on the macro network potentially could identify the beacon channel and in some instances identify the beacon channel to be a stronger network for service. When those UE attempt to camp on the beacon by sending a random access attempt, the beacon channel (using one of more possible methods) redirects the UE to the FAP's actual serving channel.

While this method is very attractive, a beacon creates an increase in co-channel interference as the macro network and the beacon channels are deployed on a shared frequency. Due to this reason, any user in a voice or data session with the macro network and coincidentally closer to the beacon channel experiences degraded or even a loss in service. To mitigate this, it has been proposed in the past that the beacon channel remains "on" only for durations of time such that degradation or loss of service is very minimal.

In some embodiments, the beacon is also capable of monitoring an increase in uplink (reverse link) received signal strength indicators (RSSI) to identify whether there is incoming interference. An incoming interference can conversely be assumed to indicate a macro network UE coming close towards the beacon coverage area. In that embodiment, upon detecting an incoming UE, the beacon either switches off completely or reduces its transmitting power just enough to alleviate uplink interference.

If access control is not exercised at the beacon, the UE attempting access at the beacon is redirected (for example, by setting a high cell individual offset via system information block number 11) to the FAP serving cell. An unauthorized UE that gets redirected to the FAP serving cell gets NAS rejected with cause "location area not allowed." This forces the unauthorized UE to return to the beacon channel and hence becomes unreachable for the duration of the beacon "on" time. In other words, a "page" sent to the unauthorized UE could be lost.

SUMMARY

In view of the foregoing, an embodiment herein provides a method for a user equipment (UE) to operate in a mobile communication network, the method comprising barring the UE from accessing at least one of a femto access point (FAP) or a beacon channel from the FAP after a beacon ON period, if the UE is not authorized to access the FAP.

Also, disclosed herein is a femto access point (FAP) present in a mobile communication network, the FAP comprising at least one processor configured for barring a user equipment (UE) from accessing at least one of the FAP or beacon channel from the FAP after a beacon ON period, if the UE is not authorized to access the FAP.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1A:
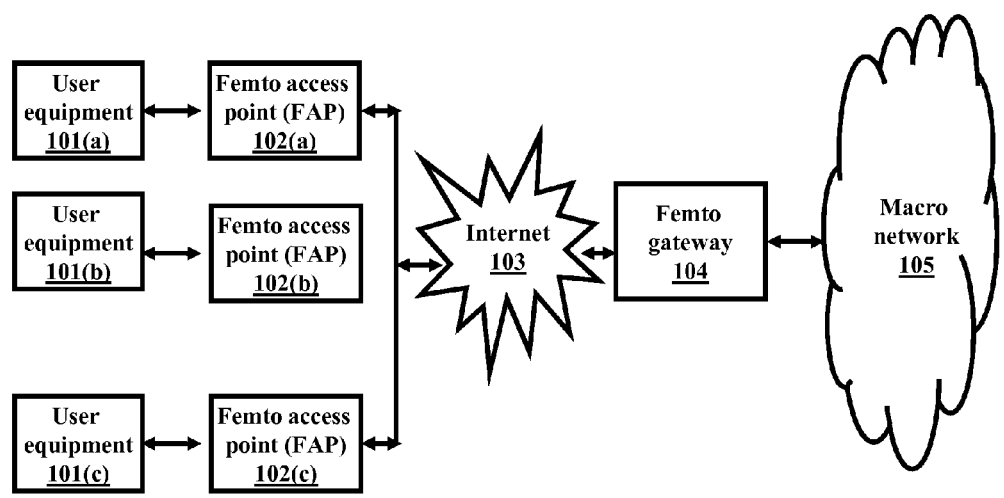
FIG. 1A illustrates a general block diagram of a femto cell network.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method for minimizing the time that unauthorized user equipment (UE) is camped on a femto access point within a femto cell network. Referring now to the drawings, and more particularly to FIGS. 1A, 1B, 2, 3, 4A, and 4B, where similar reference characters denote corresponding features consistently throughout the figures, there are shown embodiments.

Embodiments herein disclose a method to minimize service outage to unauthorized user equipment (UE). One embodiment describes a method to bar the unauthorized UE from the beacon channel for a configurable maximum time period by discouraging such UE from returning to the beacon channel. The beacon channel "ON" period is made sufficiently long enough to allow authorized UE to switch to the FAP's service channel. This duration is also long enough for the unauthorized UE to attempt selection of the FAP's service channel, though such unauthorized UE are NAS rejected with cause "location area not allowed."

Since the unauthorized UE return to the beacon channel after the NAS reject, the unauthorized UE remain "unreachable" until the beacon is "OFF."

An embodiment is described herein to "bar" the unauthorized UE by signaling a change in system information block 3 (SIB3) and setting the cell to "reserved for operator use." The duration of 3gPP timer "T barred" is set, for example, to 1280 seconds (or 22 minutes), the beacon is designed to be "ON" for a sufficient duration enough for authorized users to switch to FAP's service channel plus a shorter time sufficiently long enough to modify the SIB3 and page the UE to indicate system information change.

FIG. 1A illustrates a general block diagram of a femto cell network, as disclosed in the embodiments herein. The femto cell network includes a plurality of user equipments (UE) 101(a), 101(b), 101(c) (also referred to herein individually as "UE 101" and collectively as "UEs 101"), a plurality of femto access points (FAP) 102(a), 102(b), 102(c) (also referred to herein individually as "FAP 102" and collectively as "FAPs 102"), internet 103, and at least one femto gateway 104. The FAPs 102 may also be referred to herein as "FAP service channels 102." The internet 103 may also be referred to herein as an "internet network 103." The UE 101(a), for example, communicates with the cellular network through the FAP 102(a) and the femto gateway 104 over the internet network 103. The UEs 101 may include a suitable device such as a mobile phone or any other device capable of communicating using a cellular network to communicate with a respective FAP 102. The UEs 101 are connected to the FAPs 102 using a suitable connection. In an embodiment, only authorized UEs 101 are allowed to access the FAPs 102. In another embodiment, multiple UEs 101 can be supported by a single FAP 102.

Figure 1B:
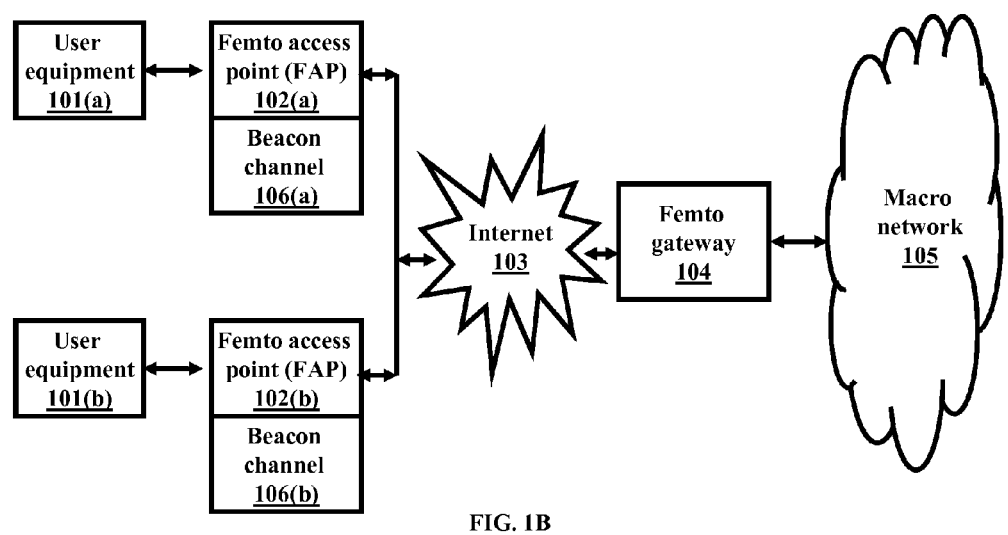
FIG. 1B illustrates a general block diagram of a femto cell network with a beacon channel, as disclosed in embodiments herein.

FIG. 1B illustrates a general block diagram of a femto cell network that is optionally enabled with a beacon channel. Here as well, the femto cell network includes a plurality of UEs 101, a plurality of FAPs 102, and associated beacon channels 106(a), 106(b) (also referred to herein individually as "beacon channel 106" or "beacon 106," and collectively as "beacon channels 106"). The beacon channels 106 are co-located with the FAP service channels 102. The beacon channel 106 and the FAP service channel 102 have different physical identity, such as a different primary scrambling code (PSC). In certain embodiments, the beacon channel 106 does not have broadband connectivity to the internet 103.

In FIG. 1A, the FAP 102 connects to the macro network 105 using a connection to the internet 103 via the femto gateway 104. The femto gateway 104 manages traffic between the FAPs 102 and the macro network 105.

Figure 2:
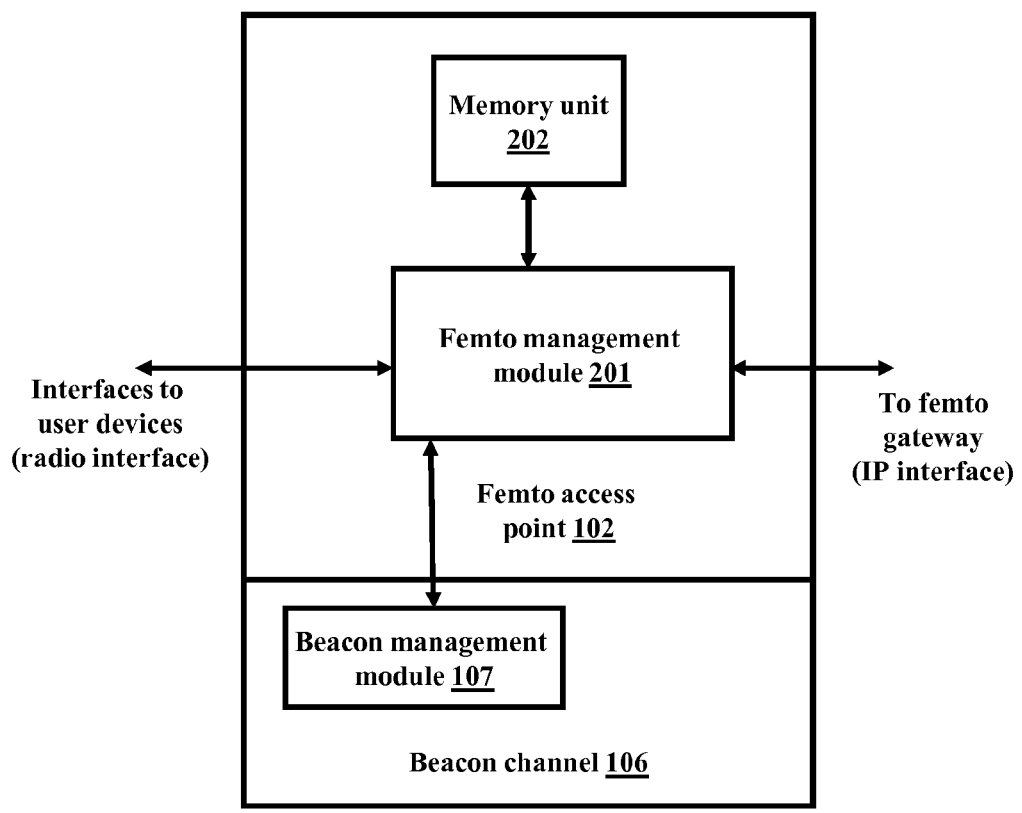
FIG. 2 illustrates a femto access point (FAP), as disclosed in embodiments herein.

FIG. 2 illustrates a femto access point (FAP) 102, as disclosed in the embodiments herein. The FAP 102 includes a femto management module (FMM) 201 and a memory unit 202. The FMM 201 provides a radio interface to user devices (e.g., UE 101) and an internet protocol (IP) interface to a femto gateway (e.g., femto gateway 104). The memory unit 202 includes a list of UE 101 identifiers (IDs) (the list also referred to herein as a UE ID list) authorized to access each FAP 102. FIG. 2 also illustrates a beacon channel 106 co-located with the FAP 102. The beacon channel 106 includes a beacon management module (BMM) 107 and an interface to the FMM 201. The FMM 201 allocates the beacon channel 106 primary scrambling code to the BMM 107. The BMM 107 autonomously configures the beacon channel 106 primary common pilot channel (PCPICH) transmit power and system information blocks for broadcast. In an embodiment, the UE ID list may include IDs corresponding to each UE so as to identify the UEs. In another embodiment, the UE IDs may be any or all of international mobile subscriber identity (IMSI), electronic serial number (ESN), international mobile equipment identity (IMEI), or any such user equipment specific identity. Upon receiving a connection request from a UE 101, the FMM 201 checks whether that particular UE 101 is authorized to access the FAP 102 by checking whether the ID of that UE 101 is present in the UE ID list corresponding to that particular FAP. The memory unit 202 includes a flag that depicts whether or not the cell corresponding to the FAP is barred from operator use.

The BMM 107 decides when the beacon channel 106 is "ON" (transmitting PCPICH) or OFF. The beacon channel 106 "OFF" could either mean PCPICH is switched completely off or a significant attenuation of PCPICH signal power such that user devices (e.g., UE 101) do not receive any power from the beacon channel 106. The BMM 107 also decides on the periodicity of the ON and OFF patterns of the beacon channel 106. The BMM 107 modifies the beacon channel 106 ON period such that the ON period is sufficient for a UE authorized to connect to the FAP service channel 102. The beacon channel 106 ON period may be selected such that it is greater than or equal to the summation of the macro cell's discontinuous reception (DRX) time, cell reselection time evaluation of the beacon channel 106, the beacon channel 106 broadcast channel (BCH) decode, and the FAP 102 measurement evaluation period. As an example, if it is assumed that a macro cell's DRX period is 1.28 seconds, [macro DRX cycle+beacon channel 106 cell reselection evaluation time+decoding of beacon channel 106 BCH+FAP 102 measurement evaluation] amounts to approximately 12 seconds. Cell reselection evaluation time, decoding time for BCH and serving cell measurement evaluation period are defined in 3gPP technical specifications 25.331, 25.304 and 25.133.

Taking the example above, the BMM 107 selects the beacon channel 106 ON period to be greater than 12 seconds, for example 15 seconds. The BMM 107 may also modify the beacon channel 106 ON time period as and when appropriate. The modification can happen when a new macro network is detected in the vicinity or another cell in the neighborhood becomes the dominant network.

The beacon channel 106 broadcasts system information block number 11 identifying the FAP service channel 102 with a high cell individual offset. Authorized UE handsets obtain service from the FAP 102 while unauthorized UE handsets get rejected by the FAP 102. When an unauthorized user gets rejected, they return to the beacon channel 106. The beacon channel 106 ON period is set such that an unauthorized UE that returns to the beacon channel 106 after a reject from the FAP 102 stays at the beacon 106 only as long as the beacon 106 is ON and the BMM 107 has not barred the beacon channel 106. The BMM 107 sets the beacon channel 106 to "barred for operator use" by modifying the SIB3 as soon as the beacon 106 ON duration is expired. The BMM 107 always switches the beacon 106 to "not barred" at the start of a next ON period of the beacon 106.

In an embodiment herein, the BMM 107 may extend the beacon 106 ON period to enable unauthorized UEs to read the modified SIB3 up to a maximum pre-specified time period.

Figure 3:
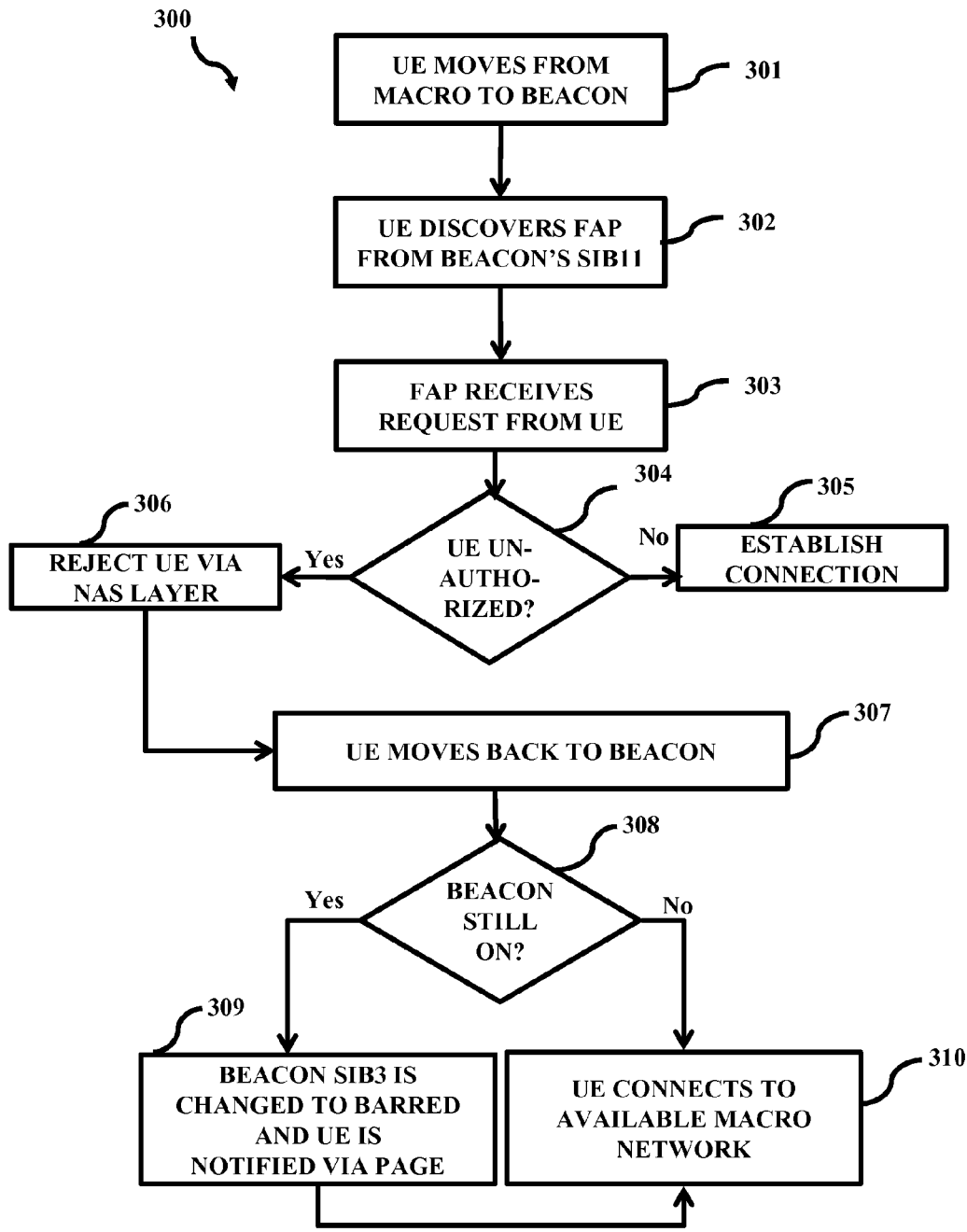
FIG. 3 illustrates a flow diagram that describes the processes involved in redirecting an unauthorized user to an available macro network, as disclosed in embodiments herein.

FIG. 3 shows a flow diagram that describes a processes or method 300 involved in redirecting unauthorized UE to an available macro network, as disclosed in certain embodiments herein. In step 301, a UE 101 initially finds a beacon channel 106 via the cell reselection procedure and sends a connection request to the beacon channel 106. However, the UE 101 discovers (step 302) the existence of an FAP service channel 102 by reading the system information block 11 (SIB11) from the beacon channel 106, where the beacon channel 106 identifies the FAP 102 as a neighbor with a high cell individual offset. Hence, the UE 101 immediately decides to reselect the FAP 102 and sends a connection request (step 303). Upon reception of the connection request, the FAP 102 checks (step 304) whether the UE 101 is authorized to access the FAP 102 or not. In an embodiment, the FAP 102 checks the authorization of a particular UE 101 by comparing the ID sent by the UE with the list of authorized UE ID's that are stored in the memory of the FAP. If the UE 101 is authorized to access that particular FAP 102, the FAP 102 allows that particular UE 101 to establish (step 305) a connection. If the UE 101 is found to be not authorized, a message indicating that the UE 101 is unauthorized (step 306) is passed by the FAP 102 via a NAS message. The UE 101 that is NAS rejected, returns to the beacon channel 106 (step 307). Since the beacon channel 106 does not service any UE, it is imprudent to keep the UE 101 under the beacon channel 106. If the beacon ON period is still valid (step 308), to discourage the UE 101 from staying under the beacon 106, the BMM 107 sets the SIB3 barred status to "cell reserved for operator use" and broadcasts the updated SIB3 (step 309). Further, the beacon 106 sends a paging message to the concerned UE 101 indicating that the system information has changed, mandating the UE 101 to re-acquire the modified system information block (309). In some embodiment, the paging might not be required depending on the time at which the UE 101 returns to the beacon 106 and the time at which the BMM 107 updates the SIB3. If the beacon ON period is expired, the UE 101 automatically moves to the best available macro network 105. The UE 101 reads the modified SIB3 and identifies the beacon 106 as barred for use. Since the FAP 102 is forbidden (rejected via the NAS message) and since the beacon 106 is barred (reserved for operator use), the UE 101 immediately moves away from the beacon 106 and selects the macro network 105 (step 310).

Figure 4A:
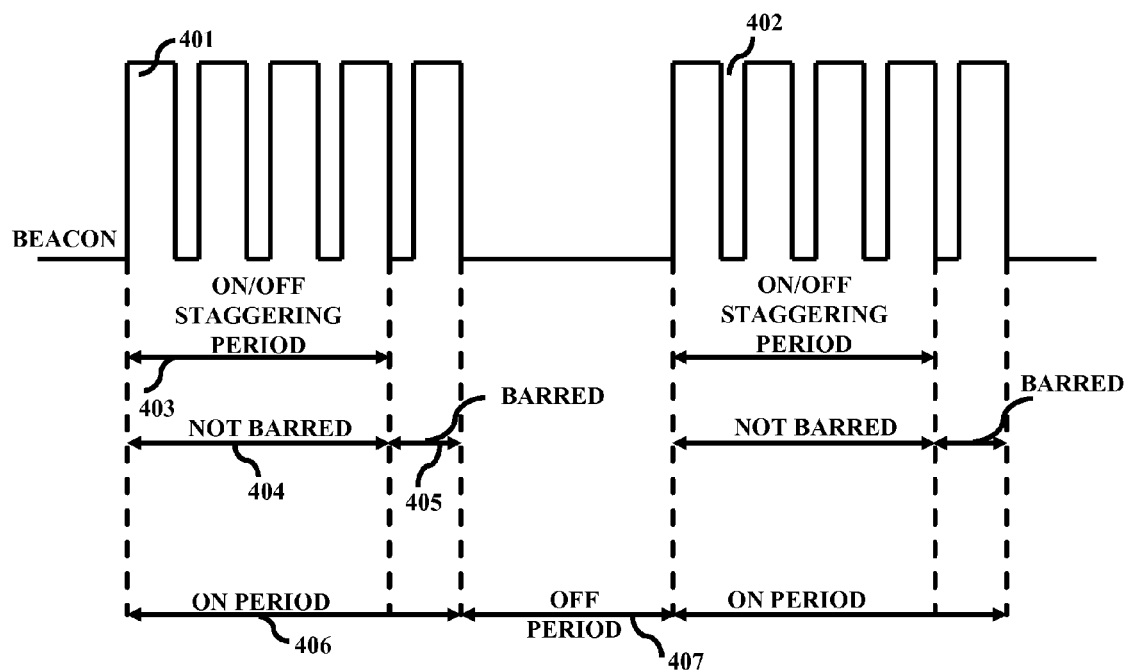
FIGS. 4A and 4B illustrate ON/OFF staggering periods of beacon and barring of an UE, as disclosed in embodiments herein.
Figure 4B:
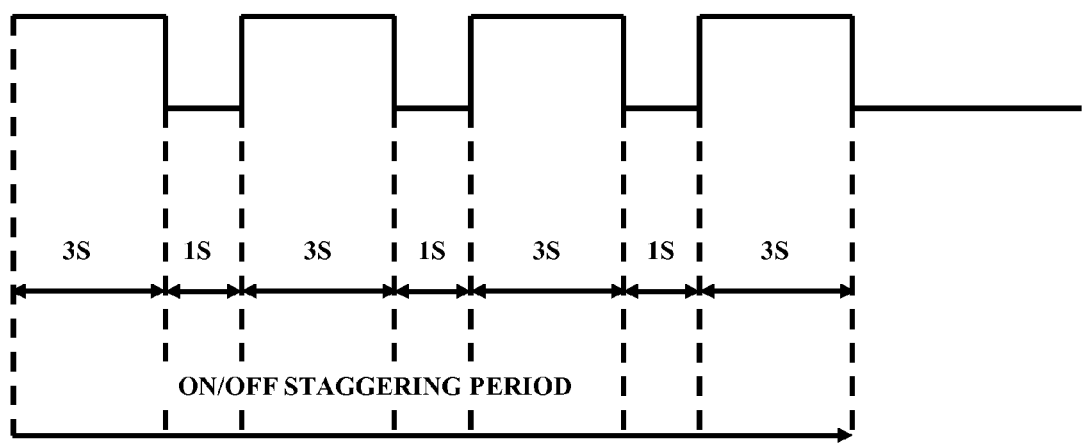

In one embodiment, the beacon channel 106 ON period can be staggered with intermittent minor ON and OFF sequences 401, 402, as shown in FIGS. 4A and 4B. This staggering helps with minimizing the interference from an incoming UE 101 from the macro network 105 in connected mode (for example, with voice or data sessions). In one embodiment, the ON period is related to parameters configured in the macro network system information such as 3gPP system information block 1 (SIB1) timer T313. Relating the ON period to be smaller than T313 allows the UE 101 to avoid an "out of synchronization" condition with the serving cell.

In FIG. 4A, the sequence of ON (406) and OFF (407) periods are shown. Further, the ON period 406 is split into two parts. The duration 404 within which the beacon channel 106 is unbarred and the duration 405 for which the beacon cell is barred together add up to the ON period 406. The unbarred duration 404 has a pattern of ON/OFF staggering 403 for the purpose of alleviating incoming interference from the UE 101 in connected mode (i.e., the UE 101 in voice and/or data sessions). The ON portion 401 of the ON/OFF staggering period 403 and the OFF portion 402 of the ON/OFF staggering period 403 are aligned with 3gPP timer T313 broadcast from the macro network 105. The ON portion 401 should be set to equal or lesser than T313 timer broadcasted in SIB1 of the macro network, and the OFF portion 402 in certain embodiments should be set to a maximum of 1 second.

FIG. 4B shows an example ON/OFF staggering period, according to one embodiment. In the example shown in FIG. 4B, T313 is shown to equal 3 seconds (3 S) during an ON portion of the ON/OFF staggering period. Though T313 of 3 seconds is a typical value in the macro network, any valid value as broadcasted by the macro network may be used. As also illustrated in the example shown in FIG. 4B, an OFF portion of the ON/OFF staggering period may be about 1 second (1 S). The various actions in the method 300 shown in FIG. 3 may be performed in the order presented, in a different order or simultaneously. Further, in some embodiments, some steps or actions listed in FIG. 3 may be omitted.

FIGS. 4A and 4B illustrate an ON/OFF staggering period of beacon and barring of a UE, as disclosed in embodiments herein. The beacon ON period, as depicted, may be selected by the BMM 107 such that it is greater than or equal to the summation of the macro DRX time, the beacon 106 evaluation time, the BCH decode period, and the FAP 102 serving channel evaluation period. An example ON period may be approximately 12 seconds, assuming a macro DRX cycle time of 1.28 seconds. Cell reselection evaluation time, decoding time for the BCH, and serving cell measurement evaluation period are defined in 3gPP technical specifications 25.331, 25.304 and 25.133. However, to give the UE 101 sufficient time to reselect the FAP 102 service channel, the BMM 107 may set the ON period to be in the range of approximately 15 seconds. The BMM 107 may also modify the beacon ON time period at a later time as necessary. The beacon ON period ensures that an unauthorized UE stays in the beacon only as long as the beacon is ON and the BMM 107 has not barred the beacon channel 106. The BMM 107 switches the beacon to "not barred" before the next ON period of the beacon 106. In an embodiment herein, the BMM 107 may extend the beacon ON period to enable unauthorized UEs to read the modified SIB3.

In certain embodiments herein, 3gPP timer "T barred" is set to the maximum possible allowed value, for example 1280 seconds. As a result, the UE 101 does not return to the beacon channel 106 until the expiry of "T barred" even if the beacon channel 106 is stronger than the current serving channel.

Taking the example of a macro DRX of 1.28 seconds, embodiments disclosed herein enable an unauthorized UE to experience a short gap of approximately 15 seconds per 22 minutes (assuming T barred=1280 seconds). During the gap, the UE 101 is unreachable and cannot be reached via a paging message from the serving cell. However, probabilistically, the chance that a network would page the UE 101 at exactly the same instance the UE is reselecting is insignificant.

The embodiments disclosed herein can be implemented through at least one software program running on at least one hardware device and performing network management functions to control the network elements. The network elements shown in FIG. 2 include blocks that can be at least one of a hardware device, or a combination of hardware device and software module.

Certain embodiments disclosed herein specify a system for redirecting unauthorized UE to macro network. It is understood that the scope of the protection is extended to such a program and in addition to a non-transitory computer readable storage medium having a message or computer executable instructions stored therein. Such computer readable storage medium may include program code for implementation of one or more steps of a method described herein, when the program runs on a server or mobile device or any suitable programmable device. The method is implemented in certain embodiments through or together with a software program written in, e.g., very high speed integrated circuit hardware description language (VHDL), another programming language, or implemented by one or more VHDL or several software modules being executed on at least one hardware device. The hardware device can be any kind of device that can be programmed including, e.g., any kind of computer like a server or a personal computer, or the like, or any combination thereof, e.g., one processor and two field programmable gate arrays (FPGAs). The device may also include means that could be, e.g., hardware means like, e.g., an application specific integrated circuit (ASIC), or a combination of hardware and software means, e.g., an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g., using a plurality of central processing units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for a user equipment (UE) to operate in a mobile communication network, said method comprising:
    transmitting, during a beacon ON period, a beacon channel from a femto access point (FAP), the beacon channel in the ON period being staggered into a plurality of sequential ON/OFF durations, two or more of the sequential ON/OFF durations corresponding to an unbarred duration, and one or more of the sequential ON/OFF durations corresponding to a barred duration;
    disabling, during a beacon OFF period, the beacon channel;
    determining that the UE is not authorized to access the FAP; and
    in response to the determination:
        allowing, during the unbarred duration of the beacon ON period, the UE to access the beacon channel; and
        barring, during the barred duration of the beacon ON period, said UE from accessing the beacon channel by setting system information block 3 (SIB3) to "barred" for normal service,
    wherein said beacon ON period is long enough to enable returning said unauthorized UE to acquire said SIB3, and
    wherein said beacon ON period is greater than a summation of macro discontinuous reception (DRX) time, beacon cell evaluation time, beacon cell's broadcast channel decode time, and serving channel evaluation period for said FAP.

2. The method, as claimed in claim 1, wherein an ON portion of the plurality of sequential ON/OFF durations of the beacon ON period equals T313 timer, and wherein an OFF portion of the plurality of sequential ON/OFF durations of the beacon ON period equals a maximum of 1 second.

3. The method, as claimed in claim 1, wherein said beacon ON period is long enough to enable an authorized UE to switch to a service channel (SC) of said FAP.

4. The method, as claimed in claim 3, wherein an ON portion of the plurality of sequential ON/OFF durations of the beacon ON period equals T313 timer, and wherein an OFF portion of the plurality of sequential ON/OFF durations of the beacon ON period equals a maximum of 1 second.

5. A femto access point (FAP) present in a mobile communication network, said FAP comprising at least one processor configured for:
    transmitting, during a beacon ON period, a beacon channel from the FAP, the beacon channel in the ON period being staggered into a plurality of sequential ON/OFF durations, two or more of the sequential ON/OFF durations corresponding to an unbarred duration, and one or more of the sequential ON/OFF durations corresponding to a barred duration;

disabling, during a beacon OFF period, the beacon channel;

determining that a user equipment (UE) is not authorized to access the FAP; and in response to the determination:
- allowing, during the unbarred duration of the beacon ON period, the UE to access the beacon channel; and
- barring, during the barred duration of the beacon ON period, the user equipment (UE) from accessing the beacon channel by setting system information block 3 (SIB3) to "barred" for normal service, wherein said FAP is further configured for ensuring said beacon ON period is long enough to enable returning said unauthorized UE to acquire said SIB3, and wherein said FAP is further configured for ensuring said beacon ON period is greater than a summation of macro discontinuous reception (DRX) time, beacon cell evaluation time, beacon cell's broadcast channel decode time, and serving channel evaluation period for said FAP.

6. The FAP, as claimed in claim 5, wherein an ON portion of the plurality of sequential ON/OFF durations of the beacon ON period equals T313 timer, and wherein an OFF portion of the plurality of sequential ON/OFF durations of the beacon ON period equals a maximum of 1 second.

7. The FAP, as claimed in claim 5, wherein said FAP is further configured for ensuring said beacon ON period is long enough to enable an authorized UE to switch to a service channel (SC) of said FAP.

8. The FAP, as claimed in claim 5, wherein an ON portion of the plurality of sequential ON/OFF durations of the beacon ON period equals T313 timer, and wherein an OFF portion of the plurality of sequential ON/OFF durations of the beacon ON period equals a maximum of 1 second.

* * * * *